United States Patent [19]

Morita et al.

[11] Patent Number: 4,835,530
[45] Date of Patent: May 30, 1989

[54] GRAPHICS DISPLAY DEVICE

[75] Inventors: Shunji Morita; Takahiko Yamamuro; Nobuo Fukushima, all of Nagasaki, Japan

[73] Assignee: Mitsubishi Denki Kabushiki Kaisha, Tokyo, Japan

[21] Appl. No.: 26,203

[22] Filed: Mar. 16, 1987

[30] Foreign Application Priority Data

Apr. 16, 1986 [JP] Japan .................................. 61-86038

[51] Int. Cl.$^4$ .............................................. G09G 1/06
[52] U.S. Cl. .................................... 340/732; 340/744; 340/747; 340/789
[58] Field of Search ............... 340/706, 709, 720, 732, 340/744, 747, 789; 248/183; 364/518, 521

[56] References Cited

U.S. PATENT DOCUMENTS

| | | | |
|---|---|---|---|
| 4,542,872 | 9/1985 | Marino et al. ....................... | 248/183 |
| 4,570,892 | 2/1986 | Czech et al. ......................... | 248/183 |
| 4,621,782 | 11/1986 | Carlson et al. ....................... | 248/183 |
| 4,626,837 | 12/1986 | Priestly ............................... | 340/747 |
| 4,640,485 | 2/1987 | Day et al. ............................ | 248/183 |
| 4,684,089 | 8/1987 | van der Lely ........................ | 340/709 |

OTHER PUBLICATIONS

"IBM Personal Computer Professional Graphics Controller Installation Instructions for the IBM Personal Computer AT", Aug. 15, 1984, pp. 1-15.

Primary Examiner—John W. Caldwell, Sr.
Assistant Examiner—Richard Hjerpe
Attorney, Agent, or Firm—Bernard, Rothwell & Brown

[57] ABSTRACT

Disclosed is a graphics display device comprising a graphics control board provided between a computer for outputting an output command of a picture image (hereinafter referred to as an image-depiction command) to be displayed on a display device such as a cathode ray tube (CRT) and said display device to process the image-depiction command from the computer by signal conversion processing and to control a display output when the display device displays a picture image, the graphics control board being divided into two boards of a signal conversion board provided within a housing case in which the computer is installed to process the image-depiction command from the computer by signal conversion processing and a display output board for controlling a supply of an output required to display the picture image by the display device on the basis of the image-depiction command.

5 Claims, 2 Drawing Sheets

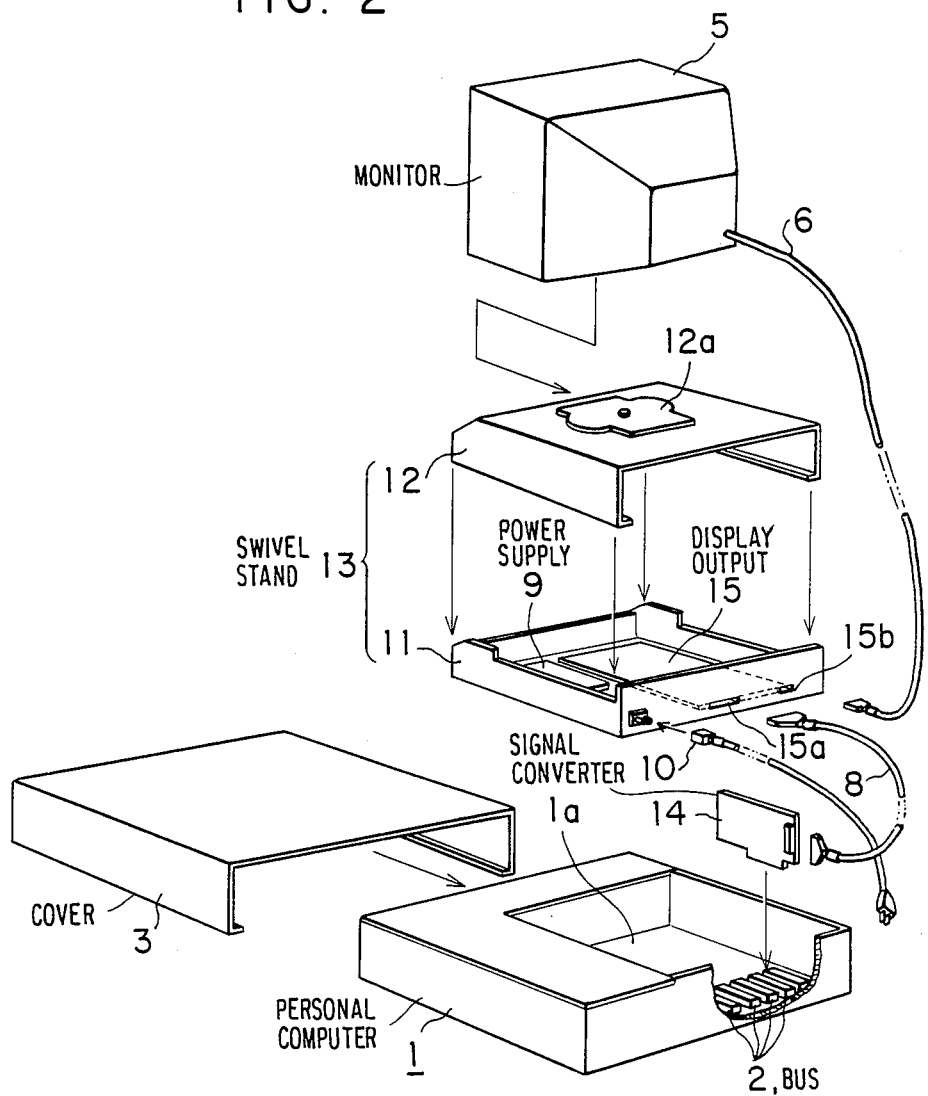

GRAPHICS DISPLAY DEVICE

BACKGROUND OF THE INVENTION

1. Field of the Invention

This invention relates to a graphics display device for displaying a picture image on a display device body for example such as Cathode Ray Tube (CRT) on the basis of a command for displaying a picture image (hereinafter called an image-depiction command) output from a computer, and more particularly to a graphics display device which improves a construction having a graphics control board for transmitting various signals such as image-depiction commands from the computer, said graphics control board being packaged on the computer body.

2. Description of the Prior Art

Generally, a graphics control board for processing the image-depiction command processed by a personal computer as a picture image is packaged into the personal computer, for example. This real construction of the graphics control board is disclosed, for example, in IBM material, "IBM Personal Computer" Professional Graphic Controller Installation Instruction for the "IBM Personal Computer AT" circulated Aug. 15, 1985. FIG. 1 is an exploded perspective view showing a schematic structure of a conventional graphics display device of this kind. In FIG. 1, an input/output bus (hereinafter called I/O bus) 2 for inputting and outputting an external control signal is provided in a recess 1a provided in a personal computer body 1, and a cover 3 that may be detachably mounted by slide construction is mounted on the personal computer body 1. A graphics control board 4 packaged in the recess 1a of the computer body 1 is connected to the I/O bus 2, and a CRT 5 as a display device body is placed on the computer body 1 with the cover 3 already mounted thereon. A portion between a graphics control board 4 and CRT 5 is connected by means of a video cable 6.

Next, operation will be described. Image-depiction information for commanding a picture image to be displayed is sent from a Central Processing Unit (CPU) (not shown) of the personal computer body 1 to the graphics control board 4 through the I/O bus 2. The graphics control board 4 analyzes and executes the aforesaid information into a final graphics image, which is output as a display output signal. This display output signal is input into the CRT 5 through the video cable 6, and the CRT 5 displays picture images such as diagrams, color, etc. thereon accordingly.

Since the conventional graphics display device has been designed as described above, in the case where one and the same image-depiction function is realized using a personal computer of another kind, the signal input and output function of the graphics control board 4 has to be adjusted to the I/O bus 2 inherent in each personal computer. Therefore, this has posed a problem that the entire graphics control board 4 has to be newly fabricated. Moreover, since the graphics control board 4 is large in size, it occupies a space of a plurality of slots of the I/O bus within the computer body, thus posing a further problem that the number of optional boards capable of being actually used in limited.

SUMMARY OF THE INVENTION

This invention has been accomplished in order to overcome these problems noted above, and an object of the invention is to provide a graphics display device which minimizes the operation conducted when one and the same image-depiction function is realized by use of a computer of another kind and is free from limitation of the number of the optional boards resulting from space as described above.

According to a graphics display device according to this invention, a swivel stand is mounted on a display device body, and a graphics control board is divided into a signal conversion board and a display output board. The signal conversion board is encased in the computer body and connected to an I/O bus, whereas the display output board is encased in the swivel stand, these boards being connected by means of a connecting cable.

BRIEF DESCRIPTION OF THE DRAWINGS

FIG. 2 is an exploded perspective view showing a schematic structure of a graphics display device according to one embodiment of the present invention.

DETAILED DESCRIPTION OF THE PREFERRED EMBODIMENTS

Figure 1:
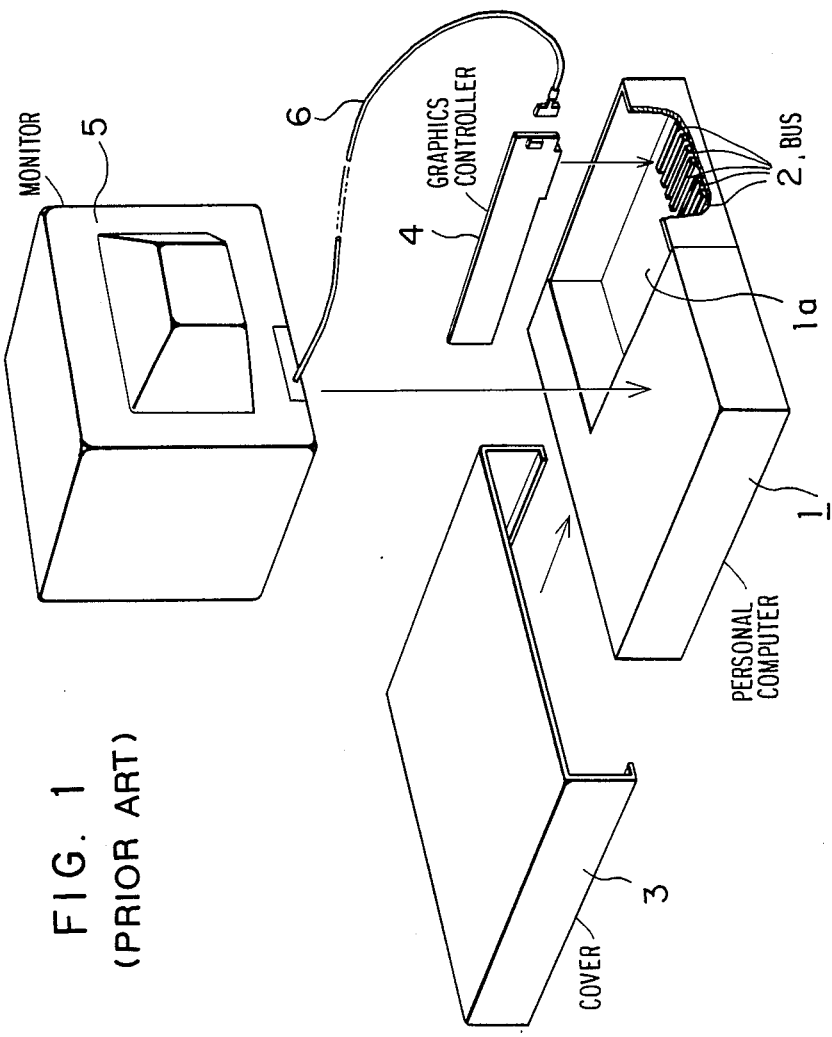
FIG. 1 is an exploded perspective view showing a schematic structure of a conventional graphics display device.

In the following, one embodiment of the present invention will be described with reference to FIG. 2. For simplifying the explanation, members in FIG. 2 similar to those shown in FIG. 1 are indicated by the same reference numerals, and the explanation thereof is suitably omitted. In FIG. 2, the graphics display device comprises a signal conversion board 14, a display output board 15, a connecting cable 8 for connecting the signal conversion board 14 and an input terminal 15a of the display output board 15, a power source 9 for converting AC voltage being sent from an AC power source cord 10 to supply required power to the display output board 15, a swivel stand base 11 for encasing therein the display output board 15 and the power source 9, a swivel stand cover 12 embracing the swivel stand base 11 to form therewith a swivel stand 13, the cover having a fitting swivel raised portion 12a provided on the top surface thereof, and an output terminal 15b of the display output board 15 connected to a video cable 6. Though not shown, CRT 5 is formed at its bottom with a recess fitted to the swivel raised portion 12a, the raised portion 12a being rotatable leftward and rightward and horizontally.

Operation of the device will now be described. Image depiction information from CPU of the personal computer body 1 is transmitted to the signal conversion board 14 via the I/O bus 2 and converted at the signal conversion board 14 into a signal adjusted to a signal standard of the display output board 15. It is noted that power for the signal conversion board 14 is supplied from the I/O bus 2 of the personal computer body 1.

The converted signal sent from the signal conversion board 14 via the connecting cable 8 is analyzed and executed by the display output board 15 and developed into a final graphic image. This image signal is input into the CRT 5 via the video cable 6, and the CRT 5 provides an output display on the display screen on the basis thereof.

As described above, only the signal conversion board 14 is encased in the recess 1a of the personal computer body 1, and the signal conversion board 14 is much smaller than the graphics control board 4 as will be apparent from the comparison with FIG. 1. Thus, the number of usable other option boards is not limited because of space. In addition, in respect of the space for receiving the display output board 15, the internal space of the swivel stand 13, which as heretofore functioned as an accessory, is effectively utilized, and therefore an extra space is not required.

Moreover, in the case where the computer is changed into another kind of a computer, only the inexpensive signal conversion board 14 need be newly remodeled. The display board 15, which is more expensive than the signal conversion board 14, is a member that may be used commonly irrespective of the kine of computer 1. Thus, the display output board 15 as a common member, the swivel stand 13 and related members may be produced in volume, thus effecting a considerably reduced cost.

Furthermore, the signal conversion board 14 consumes less current and generates less heat than the graphics control board 4 integral with the display output portion employed in the prior art, the power capacity of the personal computer 1 may be reduced, and the signal conversion board 14 itself and other parts may be less adversely affected by the rise of temperature.

While, the fundamental embodiment of this invention has been generally explained, the graphics display device according to this invention includes the following modes or forms:

(a) The construction of the I/O bus 2 of the personal computer body 1 and the system for mounting and dismounting the cover 3 is not limited to those shown in FIG. 2 but various other constructions are applicable.

(b) A power switch between the power source 9 and AC power source cord 10 may be mounted on the swivel stand base 11. Further, a convenience outlet operatively connected to an external power source switch is provided into which a power source cord (not shown) of the CRT 5 may be inserted.

(c) For mounting the CRT 5 on the swivel stand 13, various means in addition to the use of the fitting swivel raised portion 12a shown in FIG. 2 are taken into consideration. Alternatively, a suitable means is used to turn the CRT 5 leftward and rightward, and in addition, a structure may be employed which provides a vertical movement or an oscillating operation.

(d) While in the above-described embodiment, the case of a personal computer has been described as a host computer, it is noted that this can be also applied to other products similar thereto, for example, such as a work processor.

(e) It is further noted that where a series input and output portion is packaged into the display output board 15 it is possible to directly feed a signal of the personal computer body 1 to the display output board 15 from the I/O bus 2 without passing through the signal conversion board 14.

(f) A hard copy output portion is added to the display output board 15 thereby improving the function so as to obtain a hard copy output of a screen of the CRT 5.

(g) The display device body is not intended to be limited to one in which an electron ray tube such as the CRt 5 comprises a base but includes other display device which may obtain equal effects such as a liquid crystal display (LCD) apparatus.

As described above, according to the present invention, a graphics control board, which has been an integral construction, is divided into two members of a signal conversion board and a display output board, only the signal conversion board being housed in a computer body, the display output board being received into an internal space of a swivel stand. Therefore, in the case where a computer of another kind is used to realize the same image-depiction function, only the signal conversion board need by newly remodeled to cope therewith. Furthermore, since the size of the signal conversion board itself is small, the number of usable optional signal conversion boards is not limited in terms of space as encountered in prior art.

What is claimed is:

1. A graphics display device comprising a display device; a computer for processing image-depiction information and having a bus for receiving the image-depiction information which corresponds to a picture image to be displayed by the display device; and graphics control means for inputting the image-depiction information on the bus of said computer to convert said image depiction information into a display signal suitable for operating the display device to display the picture image on said display device; a rotatable swivel stand on said computer for supporting said display device; said graphics control means including two boards comprising a signal conversion board mounted in said computer and connected to said computer bus for converting said image-depiction information into a standard signal, a display output board mounted in said swivel stand and connected to said display device for responding to the standard signal to generate the display signal, and a cable connecting said two boards together to supply the standard signal to the display output board.

2. A graphics display device according to claim 1, wherein said computer has a computer body with an open-top recess and bus connectors exposed in the bottom of the recess for connecting boards to the computer bus, and said signal conversion board is installed within the open-top recess provided in said computer body and connected in a one touch manner to one of said bus connectors provided in said recess.

3. A graphics display device according to claim 1, wherein said computer includes a bus connector, said signal conversion board is connected through said bus connector to the computer bus, and there is included a second connection cable to connect said display output board to said display device.

4. A graphics display device according to claim 1, wherein said swivel stand comprises
a swivel stand base formed from an open-top flat box having said display output board installed therein and having a power source device for converting an external alternating current power into a suitable power for operating the display output board, and
a swivel stand cover having a top plate for closing the open top of said swivel stand base, said top plate having formed a raised portion on the upper surface thereof and into which is fitted a fitting recess of a bottom surface of said display device, and said raised portion being provided with a swivel mechanism by which said display device may be rotated.

5. A graphics display device according to claim 4, wherein said display output board is horizontally installed on the bottom of the swivel stand base.

* * * * *

UNITED STATES PATENT AND TRADEMARK OFFICE
CERTIFICATE OF CORRECTION

PATENT NO. : 4,835,530

DATED : May 30, 1989

INVENTOR(S) : Shunji Morita et al.

It is certified that error appears in the above-identified patent and that said Letters Patent is hereby corrected as shown below:

Column 1, line 26, "1985" should be --1984--.

Column 3, line 50, "work" should be --word--;

line 62, "CRt" should be --CRT--;

line 63, "vice" should be --vices--.

Signed and Sealed this

Seventeenth Day of April, 1990

*Attest:*

HARRY F. MANBECK, JR.

*Attesting Officer*     *Commissioner of Patents and Trademarks*